April 19, 1955   H. G. HARTMAN ET AL   2,706,420
METHOD OF TRUING GEAR CUTTERS
Filed Dec. 9, 1953   2 Sheets-Sheet 1

INVENTORS
HERBERT G. HARTMAN
FREDERICK E. MCMULLEN
LLOYD C. PATCHIN
BY Richard W. Treverton
ATTORNEY

*INVENTORS*
HERBERT G. HARTMAN
FREDERICK E. MCMULLEN
LLOYD C. PATCHIN
BY Richard W. Treverton
*ATTORNEY*

United States Patent Office 2,706,420
Patented Apr. 19, 1955

2,706,420

METHOD OF TRUING GEAR CUTTERS

Herbert G. Hartman, Irondequoit, Frederick E. McMullen, Rochester, and Lloyd C. Patchin, Irondequoit, N. Y., assignors to The Gleason Works, Rochester, N. Y., a corporation of New York Application December 9, 1953, Serial No. 397,081

9 Claims. (Cl. 76—101)

The present invention, which is a continuation-in-part of that disclosed in our application Serial No. 387,266, filed October 20, 1953, now abandoned, relates to a method of truing gear cutters after they have been sharpened, whereby gear teeth having better surface finish are obtained and the number of gears that can be cut for each sharpening of the cutter is increased. The invention relates particularly but not exclusively to milling cutters of the kind employed in generating bevel gears.

When a cutter of this kind is in use its side cutting edges describe a surface of revolution that is rolled relative to the work gear to produce tooth surfaces of the desired shape. The several blades of the cutter successively traverse the work and on each pass thereacross every blade is intended to cut a narrow land on the tooth surface, so that the completed tooth surface will be composed of a large number of narrow lands of substantially uniform width. However, if the cutting edges of successive blades do not track accurately, i. e. are not at the same radial distance from the cutter's axis of rotation, all of the cutting may be done by one or only a few of the several cutter blades, resulting in a poor surface finish characterized by "flats" or excessively wide lands.

The side faces of the cutter blades back of the cutting edges are usually relieved in such manner that upon resharpening, by grinding or otherwise cutting back the front faces of the blades, the position of the edges relative to the cutter axis remains unchanged, so that tooth surfaces cut after sharpening will be identical with those cut before sharpening. However due to inaccuracies in sharpening or in the mounting of the cutter on the gear cutting machine, the several blades of a cutter frequently do not track exactly after a sharpening operation. Where the blades are radially adjustable their tracking may be improved by a time-consuming truing operation conducted after the resharpened cutter has been remounted on the cutting machine. Where the blades are not adjustable the only recourse is to remove, resharpen, and remount the cutter, with uncertain result.

In order to overcome these difficulties it has heretofore been attempted to true the cutter, subsequent to resharpening and remounting it on the gear cutting machine, by rotating it against an abrading element, such as a burnishing tool, lap, or abrasive wheel, to thereby bring all of its cutting edges into a common surface of revolution about the axis on which the cutter will actually rotate during the gear cutting operation. However truing in this manner has been found to be impractical for commercial gear production, primarily because only very minute changes of position of the cutting edges produce pronounced changes in the character and position of the bearing of mating gear teeth, and there has been no adequate way for the machine operator to consistently position the abrading element against the cutter with the accuracy necessary to prevent such bearing changes.

The present invention utilizes the existing mechanism of the gear cutting machine to automatically position an abrading tool and to move it relative to the cutter to true the cutting edges, and, in doing so, to form narrow lands back of these edges. The judgment and skill of the operator in no way enters into the positioning of the abrading element. According to the invention the cutter after being sharpened is mounted on the machine in the usual manner and the machine is operated to generate a gear which is subsequently used as an abrading tool. After the generating operation is completed the gear is retained on the machine, with its relationship to the cutter undisturbed. The machine is then operated through another tooth generating cycle, but this time with an abrasive material applied to the surface of the gear, and, preferably, with the cutter rotating in the opposite direction. The generating motion causes the edges of the cutter blades to progressively traverse the tooth surface, thereby producing narrow lands back of the edges of abrading action, and, due to the higher pressure exerted on high blades, eliminating inequalities in the locations of the cutting edges of the blades. The abrading gear is then removed and without any further truing or any adjustment of the cutter, but with the cutter rotating in its usual direction, the machine operated to generate gears.

Gears produced by cutters trued in this manner have been found to have a superior surface finish. Furthermore cutter life tests have shown that on the average a substantially larger number of gears can be cut per cutter sharpening than with cutters not so trued.

In the accompanying drawings.

Figure 5:
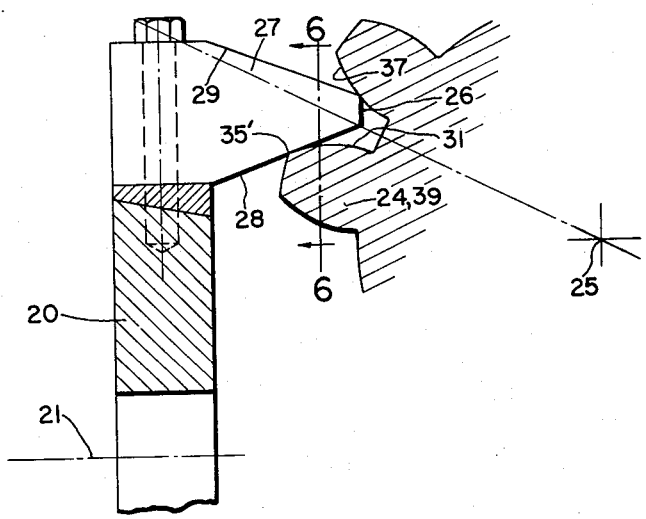
Figs. 3, 4 and 5 are fragmentary sectional views in a plane containing the axis of the cutter, showing the relationship of the cutter to a gear, or the abrading tool, respectively at the beginning, at a mid-point and at the end of the tooth surface generating action.

In the conventional generation of tapered gears having longitudinally curved teeth, i. e. spiral bevel and hypoid gears, a cutter 20 is mounted for rotation about its axis 21 on a cradle 22. The cradle rotates about its axis 23 in timed relationship to rotation of a work gear 24 about its axis 25. The axis 21 of the cutter is either parallel or inclined at an acute angle to the cradle axis 23, and the work axis 25 is so positioned relative to the cutter that the tip edges 26, Fig. 5, of the cutter blades 27 cut the root surfaces 30, Fig. 2, of the gear while the inner and outer side cutting edges 28 and 29 respectively generate the convex and concave side faces 31 and 37 of the gear teeth. In the generating action the surfaces of revolution described by the cutting edges 28, 26 and 29 represent one tooth of an imaginary generating gear that is rolling in mesh with the work gear, the generating gear turning on its axis 23 while the work gear turns on its axis 25. Thus, with the directions of relative motion shown by the arrows in Fig. 1, the cutter moves between the successive positions shown at 20', 20 and 20", the cutter axis moving between successive positions 21', 21 and 21", in time with work gear rotation.

Figure 4:
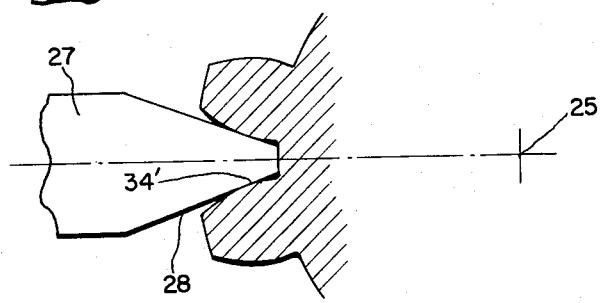

The inside cutting edges 28 engage the surface 31 first at a point 32 that is located at small end of the tooth near the root surface 30, and at the end of the generation will engage surface 31 at the tip 36 of large end of the tooth. Due to the tooth spiral angle, which results in the teeth being "wrapped around" the conical root surface of the gear, the inside cutting surface of revolution, i. e. the surface of revolution swept by the blade edges 28 will at each instant during the generation contact the tooth surface 31 along a diagonal line. When in the phase of generation shown in Fig. 3 the contact will be approximately along the diagonal line 33 shown in Fig. 2 as passing through point 33'. Subsequently, when the generation has proceeded to the phase shown in Fig. 4, the contact will be along the diagonal line 34, Fig. 2, through point 34', Fig. 2, and when in the phase shown in Fig. 5, along the diagonal line 35 through point 35'. On each pass of a blade edge 28, the contact of the edge with surface 31 progresses along one such diagonal line, from right to left in Fig. 2. Only a small portion of the edge 28 is in contact with the work gear at any one instant but during each pass of the blade the contact progresses for substantial distance along the edge 28, the progression being from the tip to the root of the blade in this instance.

After each generating motion the machine automatically withdraws the work from the cutter (or vice versa), indexes the work by rotating it through one pitch about its axis 25, return rolls the cradle and the work to their initial positions, advances the work to re-engage the cutter, and then repeats the generation with the cutter acting in another tooth space of the work. This cycle is repeated until all teeth of the gear have been cut, after which the machine will automatically stop with the gear withdrawn from the cutter. In some processes the cutters have alternate blades whose side cutting edges 28 and 29, respectively, cut simultaneously the opposite sides 31 and 37, Fig. 5, of a tooth space, while in other processes only one side, say 31, is cut in one operation while the other side, 37, is cut in a separate operation, often on another gear cutting machine. In some instances the gear teeth are cut from solid blanks in one operation, while in others the tooth spaces are first roughed out close to finish size either by a generating or by a form-cutting process.

Figure 6:
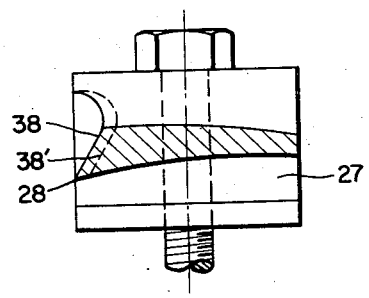
Fig. 6 is a sectional view through a cutter blade in the plane indicated by section line 6—6 in Fig. 5; and, Fig. 7 is a greatly magnified sectional view through the cutting edge of the blade shown in Fig. 6.

According to the preferred method of practicing the present invention, applicable to any of these cutting processes, after a cutter 20 has been resharpened, by grinding or otherwise cutting back the front faces 38 of its blades, say to the position shown at 38' in Fig. 6 (exaggerated in amount of cutback), it is remounted on the gear cutting machine in the usual manner. An uncut gear blank or a previously roughed out gear, designated 39, that is to become the abrading tool, is also mounted on the machine, and is generated in the usual manner, heretofore described, the machine stopping automatically after the last tooth has been cut and the gear has been withdrawn from the cutter. The gear 39 may be composed of a material which itself is abrasive and can be cut without excessively dulling the cutter, or of a material which is capable of supporting an abrasive. We prefer to make the gear of cast iron since this material has sufficient porosity to support a lapping compound. Various compounds of this kind may be used, one which we have found satisfactory being levigated aluminum oxide, of about 1000 grit size, supported in a non-fluid mineral oil, i. e. an oil having strong adhesive properties, with about three parts by volume of the powdered abrasive to one part of the oil. This mixture is simply brushed onto the surface or surfaces of the tooth space which will next be swept by the cutter blades when the machine is restarted. The cutter drive is now reversed, but not the generating drive. That is, the rotation about cutter axis 21 is reversed, but not the rotations about axes 23 and 25. The machine is then run through one generating roll, and is stopped at the end of the roll as soon as the gear is withdrawn from engagement with the cutter. Any remaining abrasive is now wiped from the cutter. The abrading gear is removed, the cutter drive is again reversed (to cause the cutter to run in its normal cutting direction), and the machine is now ready for regular gear cutting operations.

Figure 7:
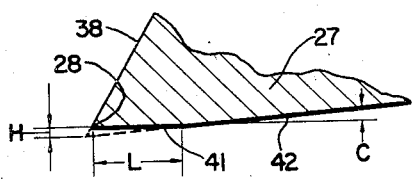

During the cutter abrading operation the drive train for producing the rotations about axes 23 and 25 is run in the same direction as during gear cutting so that even the backlash and deflections in the generating drive train will be exactly the same as during a cutting operation. The only difference in positional relationship of the gear and the cutter results from possible backlash in the cutter drive train due to the cutter being run in reverse direction and in slight deflection of the machine resulting from cutting loads. Whatever the cause, we have found that during the abrading operation narrow lands 41, Fig. 7, are formed back of the side cutting edge 28 (and 29), the width L of most of the lands being on the order of 0.003 to 0.004 of an inch, although on a high blade it may be as wide as 0.008 of an inch or more. Inasmuch as the side relief angle C of the blades, i. e. the angle which the clearance side face 42 of the blade makes with the surface of revolution described by edge 28, is on the order of only about three or four degrees, we calculate that the distance H, by which the cutting edge 28 is moved back radially of the cutter by the abrading action, is only about 0.0001 to 0.0003 of an inch, an amount too small to noticeably affect the character or location of the tooth bearing. The direction or inclination of the cutting edge to the cutter axis, which has a more pronounced effect upon the tooth bearing, is not affected to any measurable or discernible degree.

Good results may be obtained by employing any of a wide variety of cutter and generating speeds during the abrading operation. However we prefer to operate the cutter at about the same speed as during actual gear cutting and to operate the generating train at from about 50% to 100% of its normal speed. Ordinarily, in gear cutting machines of the general kind referred to, there is no timed relationship between the rotation of the cutter and the rotations of the gear and the cradle. However if the cutter rotation were kept in phase relation with the generating motion, so that a given blade of the cutter would always pass across the gear teeth in exactly the same track, we would prefer to alter the timing so as to destroy this phase relation during the abrading operation, for a reason which will hereinafter appear.

Figure 2:
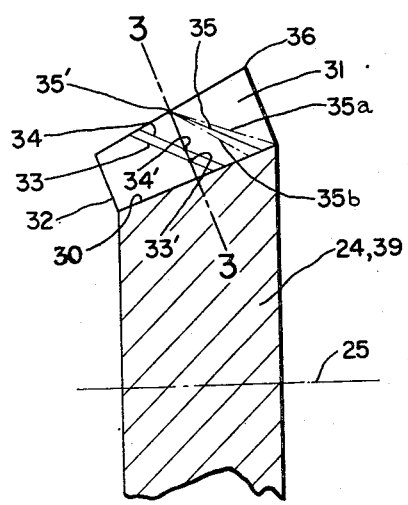
Fig. 2 is a fragmentary axial sectional view through a gear, showing the side or working faces of one tooth in elevation.
Figure 3:
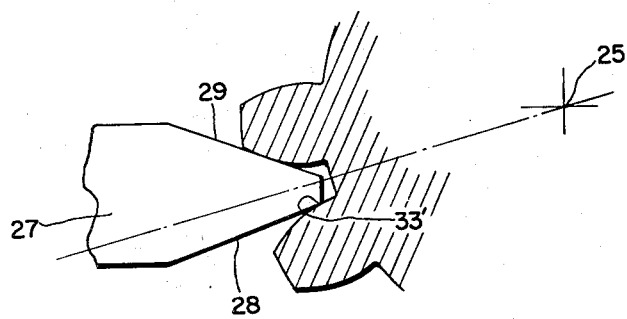

During each pass of a cutting edge 28 or 29 over the abrasive coated surface of a gear tooth, the point of contact shifts constantly along the edge as the contact progresses along successive lines such as 33, 34 and 35 in Fig. 2. The portion of the blade edge which contacts the work during one pass overlaps the portions of the edge that are in contact during preceding and succeeding passes, so that each point on the edge is lapped against a number of different points on the surface 31. Furthermore, when the cutter rotates at a different speed in relation to the speed of the generating motion, the contact of the blade edge will follow a slightly different course across the tooth surface than it did when cutting the surface. That is, instead of following path 35 it may follow path 35a or 35b, Fig. 2, depending upon the direction of rotation. The amount of divergence of lines 35a and 35b from line 35 is, of course, greatly exaggerated in Fig. 2. However, because of the divergence, the blade instead of following the narrow lands which compose the tooth surface is caused to traverse these lands and to pass across the minute ridges that exist at the lines of intersection of adjacent lands.

As indicated hereinbefore, we have found that best results are obtained by carrying the abrading action through only one generating cycle of the machine. However, it may be desirable in some instances, as for example when a milder abrasive is used, or when the cutter before being abraded produces unusually pronounced flats, to carry the action through two or more generating cycles, so that the cutting edges will be abraded by several successive tooth surfaces. Inasmuch as only one tooth space of the gear 39 is ordinarily used, our only reason for cutting all of the teeth of this gear is that the machines we have used include no convenient means for causing the cutter to act in the same tooth space on two successive generating cycles without disturbing the machine-timed relationship between the cutter and the work gear. With a machine having such means it might be advantageous to cut only one tooth space of the gear 39 before proceeding with the abrading action.

The method described, while effective in truing the cutter blades so that they will produce a superior surface finish on the work, does not destroy modifications in the shape of the blade profiles which are intentionally provided. For example a decrease of the pressure angle adjacent the tip of the blade that is provided in accordance with Patent No. 2,385,220, granted September 18, 1945, to F. E. McMullen, will be reproduced in the abrading gear 39 and hence will not be altered by the subsequent abrading operation.

When employing a cutter whose blades are radially adjustable it is preferred that they be accurately trued by such adjustment, while the cutter is mounted on the particular gear cutting machine on which it is to be used, before the procedure of the present invention is carried out. This is desirable since a cutter whose blades are poorly adjusted, or have been trued on a machine other than the one on which the cutter is to be used, may have so much blade run-out that even by practice of the present invention optimum results cannot be obtained. However when the present invention is practiced such blade adjustment need not be repeated so long as the cutter is used on the same machine, regardless of the number of times it is removed for resharpening.

It will be understood that the foregoing description is made merely by way of illustration and example, and not by way of limitation, for there are a number of alternative ways in which the invention may be practiced. For example the abrading gear may be composed of other metals than cast iron or even of a non-metallic material; a wide variety of abrasives may be used; or, if desired, the abrasive may be omitted and the surface of the cast iron or other material making up the gear 39 may itself serve as the abrading agency.

When a steel gear is used as the abrading tool and the cutter is abraded while rotating in the same direction in which it cuts, a more severe abrading action is necessary to condition it to produce tooth surfaces devoid of flats, and some dulling of the cutting edges results. On comparative tests conducted with the same cutter, when the abrading operation was carried out as hereinbefore described with a cast iron pinion used as the abrading tool and with the cutter running in reverse direction, a steel pinion subsequently cut with the abraded cutter was found to have surface finish of 30 micro inches free of flats. This compared with a surface finish of 35 micro inches with pronounced flats on a steel pinion previously cut with the cutter freshly sharpened but not conditioned by abrasion. When a steel pinion was used as the abrading tool, with the cutter running forwardly, it was necessary to use a harsher abrasive and to extend the abrasion over several generating cycles of the machine. The abrasive compound used was 35% silicon carbide of approximately 280 grit size in a mineral oil base. The tooth surface finish of a subsequently cut steel pinion was improved in that it was devoid of flats. However the surface finish was 70 micro inches, which, while acceptable, indicated that some dulling of the cutting edges had occurred during the abrading operation. Thus the method employing a cast iron gear and reverse cutter rotation is preferred where a maximum number of work pieces are to be cut per sharpening of the cutter.

Figure 1:
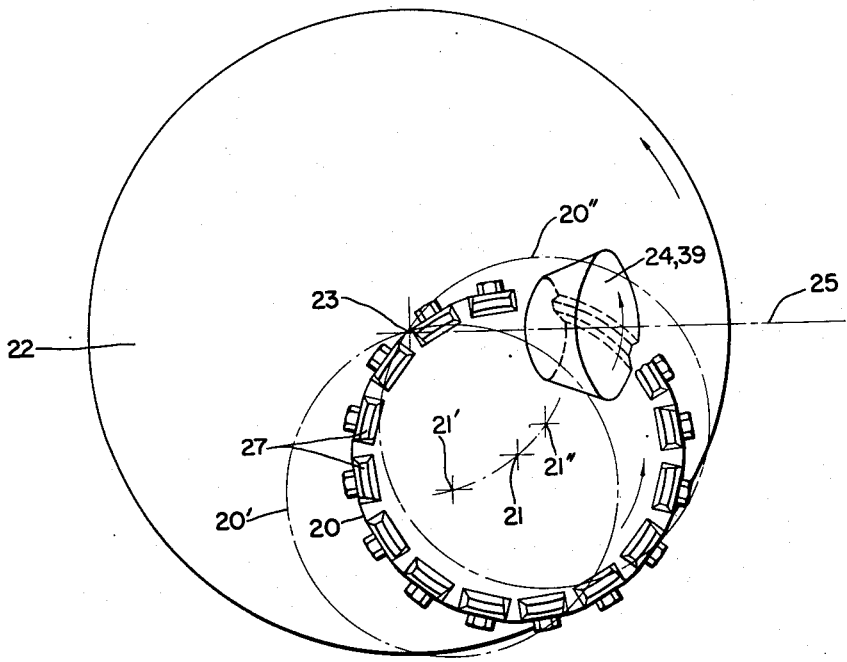
Fig. 1 is a schematic view of the cutter and cutter supporting part of a conventional gear generating machine, showing the relationship of the cutter to a work gear, or to a gear-shaped abrading tool.

The invention is also applicable to rotary cutters other than those having circularly arranged blades such as shown in Fig. 1. For example it is equally applicable to a hobbing cutter such as is shown in Patent No. 1,349,951, granted August 17, 1920, to J. E. Gleason and A. L. Stewart. Accordingly it will be understood that the principles involved may be employed in various different ways without departing from the spirit of our invention or from the scope of the appended claims.

What we claim is:

1. The method of truing a multi-bladed rotary gear cutter after the same has been sharpened and mounted on a gear cutting machine, which comprises operating the machine through a cutting cycle to cut at least one gear tooth surface with the cutter, and then operating the machine through another cycle with an abrasive applied to the zone of contact of the cutter and the tooth surface.

2. The method of truing a multi-bladed rotary gear cutter after the same has been sharpened and mounted on a gear cutting machine, which comprises mounting a work gear on the machine and operating the latter through a cutting cycle to cut at least one gear tooth surface with the cutter, and then, without disturbing the machine-established relationship of the cutter to the tooth surface, operating the machine through another cycle with an abrasive applied to the zone of contact of the cutter and the tooth surface.

3. The method of truing a multi-bladed rotary gear cutter after the same has been sharpened and mounted on a tapered gear cutting machine which provides a relative rolling generating motion between the rotating cutter and a work gear, which comprises mounting a work gear on the machine and cutting at least one gear tooth surface by operating the machine through a generating cycle, then applying an abrasive to said tooth surface, and then, without disturbing the machine-established relationship of the cutter to the tooth surface, operating the machine through another generating cycle with the cutter in contact with the abrasive coated tooth surface.

4. The method of truing a multi-bladed rotary gear cutter after the same has been sharpened and mounted on a gear cutting machine, which comprises operating the machine through a cutting cycle to cut at least one gear tooth surface with the cutter so mounted, and then operating the machine through another cutting cycle with the cutter rotating in the reverse direction in contact with said surface for abrasion thereby.

5. The method of claim 4 in which an abrasive compound is applied to the tooth surface prior to operating the machine through said other cutting cycle.

6. The method of truing a multi-bladed rotary cutter for tapered gears after the same has been sharpened and mounted on a gear cutting machine which provides a relative rolling generating motion between the rotating cutter and a work gear, which comprises cutting at least one gear tooth surface with the cutter by operating the machine througth a generating cycle, and then operating the machine through another generating cycle with the cutter rotating in the reverse direction in contact with the tooth surface previously cut.

7. The method of truing a multi-bladed rotary cutter for tapered gears after the same has been sharpened and mounted on a gear cutting machine which provides a rolling generating motion between the rotating cutter and a work gear, with different points along the side cutting edges of the cutter blade contacting the work gear as the rolling generating motion proceeds, which comprises cutting at least one gear tooth surface on a work gear by operating the machine through a generating cycle, and then, without disturbing the relation of the cutter and the work gear, operating the machine in the same direction through another generating cycle with the cutter rotating in the reverse direction in contact with said tooth surface, to thereby produce lands on the cutting side faces of the blades immediately back of the side cutting edges thereof, by abrading action of said tooth surface upon the blades.

8. The method of truing a multi-bladed rotary cutter for tapered gears after the same has been sharpened and mounted on a gear cutting machine which provides a rolling generating motion between the rotating cutter and a work gear, with different points along the side cutting edges of the cutter blades contacting the work gear as the rolling generating motion proceeds, which comprises cutting at least one gear tooth surface on a work gear by operating the machine through a generating cycle, applying an abrasive medium to said surface, and then, without disturbing the relation of the cutter and the work gear, operating the machine in the same direction through another generating cycle with the cutter rotating in the reverse direction in contact with said tooth surface, to thereby produce lands on the cutting faces of the blades, immediately back of the side cutting edges thereof, by abrasion.

9. The method of truing a multi-bladed rotary cutter for tapered gears after the same has been sharpened and mounted on a gear cutting machine which provides a rolling generating motion between the rotating cutter and a work gear, with different points along the side cutting edges of the cutter blades contacting the work as the rolling generating motion proceeds, and with such points of contact also shifting during each traverse of the blade across the work, which method comprises cutting at least one gear tooth surface on a cast iron gear by operating the machine through a generating cycle, then coating said surface with a finely divided abrasive material in liquid suspension, and then, without disturbing the relation of the cutter and the gear as established before the cutting of said surface, operating the machine in the same direction through another generating cypcle but with the cutter rotating in the reverse direction in contact with said tooth surface, and with the ratio of cutter rotation to generating motion greater during the reverse direction rotation of the cutter than during the cutting of said surface.

No references cited.